(12) United States Patent
Blank et al.

(10) Patent No.: US 6,647,183 B2
(45) Date of Patent: Nov. 11, 2003

(54) OPTICAL COUPLING SYSTEM

(75) Inventors: Jürgen Blank, Berlin (DE); Georg Jeiter, Berlin (DE); Detlef Kuhl, Berlin (DE); Volker Plickert, Brieselang (DE); Karsten Drögemüller, Eichenau (DE); Jörg-Reinhardt Kropp, Berlin (DE); Lars Leininger, San Jose, CA (US); Herwig Stange, Berlin (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/205,211

(22) Filed: Jul. 25, 2002

(65) Prior Publication Data

US 2003/0039445 A1 Feb. 27, 2003

Related U.S. Application Data

(63) Continuation of application No. PCT/DE01/00237, filed on Jan. 17, 2001.

(30) Foreign Application Priority Data

Jan. 25, 2000 (DE) .................................... 100 03 966

(51) Int. Cl.$^7$ ................................................ G02B 6/26
(52) U.S. Cl. ............................................ 385/38; 385/31
(58) Field of Search ............................ 385/15, 31, 33, 385/34, 38, 39, 49, 50, 88

(56) References Cited

U.S. PATENT DOCUMENTS

| 4,199,222 | A | | 4/1980 | Ikushima et al. ............. 385/92 |
|---|---|---|---|---|
| 4,381,882 | A | | 5/1983 | Sabine ......................... 385/77 |
| 5,457,759 | A | * | 10/1995 | Kalonji et al. ................ 385/31 |
| 5,734,765 | A | * | 3/1998 | Artjushenko et al. ......... 385/31 |
| 5,937,122 | A | | 8/1999 | Ohki et al. .................... 385/78 |
| 6,044,188 | A | | 3/2000 | Kropp .......................... 385/33 |
| 6,501,878 | B2 | * | 12/2002 | Hughes et al. ................ 385/35 |

FOREIGN PATENT DOCUMENTS

| DE | 27 50 322 A1 | 5/1978 | ............ G02B/5/14 |
|---|---|---|---|
| DE | 36 17 799 A1 | 12/1987 | ............ G02B/6/42 |
| DE | 39 10 711 A1 | 10/1990 | ............ G02B/6/26 |
| DE | 196 45 295 A1 | 4/1998 | ............ G02B/6/26 |
| EP | 0 404 053 B1 | 12/1990 | ....... H01L/31/0203 |
| EP | 0 826 998 A2 | 3/1998 | ............ G02B/6/42 |
| EP | 0 831 350 A2 | 3/1998 | ............ G02B/6/42 |

* cited by examiner

*Primary Examiner*—John D. Lee
(74) *Attorney, Agent, or Firm*—Laurence A. Greenberg; Werner H. Stemer; Ralph E. Locher

(57) ABSTRACT

To ensure laser safety, also in the case of a largest possible coupled optical power, during the direct optical coupling of a light-emitted component to an optical waveguide, an optical system includes coupling the light through a fiber end configured as a multimode step index optical waveguide having a numeric aperture larger than the half-width value of the angular distribution of the radiation emitted from the radiation source. To distribute the radiation fed into the actual optical waveguide over the largest possible angular range with regard to the luminous power, the coupling of the light beam into the fiber end is effected such that the coupled light beams are inclined in relation to the geometric axis of the optical core of the fiber end at a defined angle.

28 Claims, 1 Drawing Sheet

OPTICAL COUPLING SYSTEM

CROSS-REFERENCE TO RELATED APPLICATION

This application is a continuation of copending International Application No. PCT/DE01/00237, filed Jan. 17, 2001, which designated the United States and was not published in English.

BACKGROUND OF THE INVENTION

Field of the Invention

The invention lies in the field of optical waveguides and can be applied to the configuration of connections between optoelectronic components, in particular, light-emitting components such as laser diodes and multimode optical waveguides.

During the direct optical coupling of light-emitting components that have weak wave-guidance, and, thus, little expansion of the pencil of rays that occurs, to multimode optical waveguides, illumination of the core of the respective optical waveguide is only partially achieved. By way of example, this is the case during the coupling of a laser diode of the VCSEL type and a multimode optical waveguide. During the direct coupling of such a laser diode without an imaging system to a multimode waveguide with a graded-index profile, as is predominantly used in transmission in the field of data communication, only the low-order modes are excited in the optical waveguide. When the light beam emerges from the optical waveguide, this leads to a light beam with little angular expansion so that the guidelines for so-called laser safety—which is intended to serve to avoid damage to eyes—can be exceeded even at relatively low optical radiation levels. Such a problem becomes particularly acutely apparent in the case of modules in which a plurality of light-emitting components are disposed as an array because, in this case, a plurality of optical waveguides are closely adjacent and, accordingly, the radiated light cones of the individual waveguides are superposed from one another such that extremely high radiation levels can arise in the detection of the emitted radiation for evaluation of laser safety.

For coupling light-emitting or light-receiving components to an optical waveguide, there exists in the prior art a placement of a stub of an optical fiber between the end of the optical waveguide and the component and an inclination of that end side of the fiber stub that is directed toward the component relative to the geometrical axis of the fiber stub to preclude reflections. See U.S. Pat. No. 5,937,122 to Ohki et al. For coupling light into a multimode waveguide, use has also been made of a fiber stub made from a monomode optical waveguide, that end face of the fiber stub that is directed toward the optical waveguide bearing in a planar manner on the end face of the optical waveguide. See German Published, Non-Prosecuted Patent Application DE 196 45 295 A1, corresponding to U.S. Pat. No. 6,044,188 to Kropp.

SUMMARY OF THE INVENTION

It is accordingly an object of the invention to provide an optical coupling system for coupling a radiation source to a multimode optical waveguide that overcomes the hereinafter-mentioned disadvantages of the heretofore-known devices of this general type and that configures the coupling system such that the highest possible optical power can be transmitted whilst ensuring so-called laser safety.

With the foregoing and other objects in view, there is provided, in accordance with the invention, an optical coupling system for coupling a radiation source emitting radiation as a light beam along an optical axis in an emission direction to a multimode optical waveguide having acceptance angle, the optical coupling system including an optical fiber having a stub, an optical core, an optical cladding, an end-side coupling-out face, an end-side coupling-in face, and a geometrical axis, the stub being a multimode step-index waveguide having an acceptance angle greater than a half-value width of an angular distribution of the radiation emerging from the radiation source, the stub to be disposed downstream of the radiation source with respect to the emission direction, the coupling-in face to be directed toward the radiation source, the coupling-out face to be directed toward and directly connected to the optical waveguide, and the coupling-in face to be associated with the radiation source to couple the light beam into the optical fiber and to incline the light beam, as a coupled-in light beam, relative to the geometrical axis by an-angle greater than 2° and less than the acceptance angle of the optical waveguide.

The invention provides that the radiation source and the coupling-in face of a multimode fiber stub are associated with one another such that a light beam emitted along the optical axis of the radiation source as coupled-in light beam is inclined relative to the geometrical axis of the optical core of the fiber stub by an angle that is greater than 2° and less than the acceptance angle of the optical waveguide.

The inclination—provided according to the invention—of the main direction of the light beam in the fiber stub and the use of a fiber stub made of a multimode step-index waveguide have the result that the radiation, on account of the light guidance in the step-index fiber, even on a very short length of about 5 to 10 mm, is homogeneously distributed both over the cross-sectional area and in the angular distribution such that a radiation with an expanded beam angle emerges at the exit face of the pin stub. In such a case, the luminous power is also distributed over a large angular range so that the intensity measured in a constricted angular range according to the guidelines for laser safety becomes particularly low. This is particularly advantageous in the case of multiple systems to ensure so-called laser safety even when the individual optical waveguides have a spacing of about 250 $\mu$m.

The extent of the inclination—provided according to the invention—of the main direction of the coupled-in light beam in the fiber stub substantially depends on the half-value width of the angular distribution of the radiation emerging from the radiation source, and of the acceptance angle of the fiber stub and also on the acceptance angle of the optical waveguide to be connected. With account additionally being taken of the coupling efficiency between the radiation source and the optical waveguide, the extent lies in the range of about 2 to 10°.

The coupling-in of the light beams into the fiber stub, the coupling-in being provided according to the invention and deviating from the course of the geometrical axis of the optical core of the fiber stub, that is to say, being slanted, can be realized in different ways.

The simplest possibility in terms of production engineering lies in correspondingly inclining the optical axis of the radiation source relative to the geometrical axis of the optical core of the fiber stub.

With regard to the configuration of the components on a carrier substrate, it may also be advantageous, however, to dispose the optical axis of the radiation source and the geometrical axis of the optical core of the fiber stub coaxially with respect to one another and to incline the coupling-in face of the fiber stub relative to the geometrical axis thereof.

What is particularly expedient—due to its axially short structural length—is the variant of inclining the coupling-in face of the fiber stub relative to the geometrical axis of the optical core of the fiber stub and configuring the radiation source radially with respect to the fiber stub such that the radiation is reflected at the coupling-in face. Such a coupling-in is disclosed, in principle, in European Patent Application EP 0 404 053 B1, corresponding to U.S. Pat. No. 5,023,447to Masuko et al., but not in conjunction with slanted coupling-in.

To be able to couple as much luminous power as possible into the optical fiber adjoining the fiber stub, in accordance with a concomitant feature of the invention, the diameter of the optical core of the fiber stub should be at most 1.1 times the diameter of the optical core of the optical waveguide.

Other features that are considered as characteristic for the invention are set forth in the appended claims.

Although the invention is illustrated and described herein as embodied in an optical coupling system, it is, nevertheless, not intended to be limited to the details shown because various modifications and structural changes may be made therein without departing from the spirit of the invention and within the scope and range of equivalents of the claims. The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
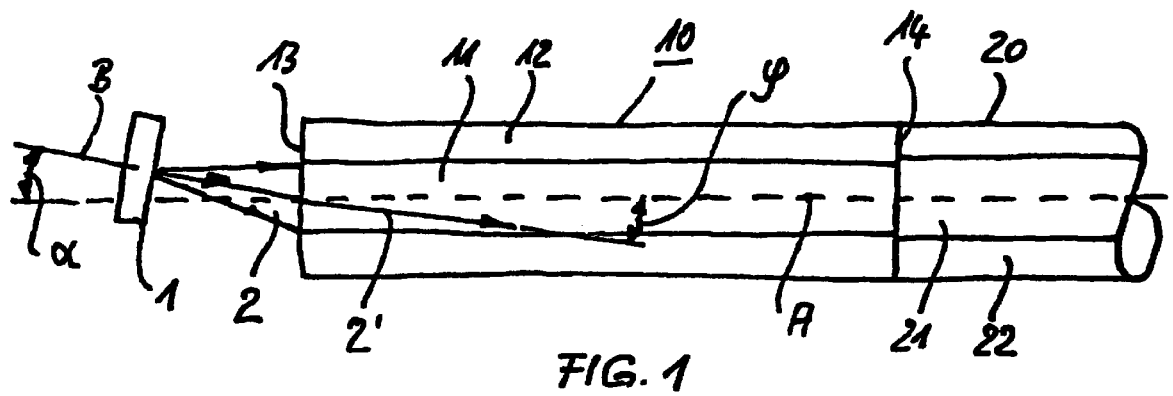
FIG. 1 is a diagrammatic, fragmentary illustration of a coupled in radiation from an inclined radiation source according to the invention.

Referring now to the figures of the drawings in detail and first, particularly to FIG. 1 thereof, there is shown a fiber stub 10 that is produced from a step-index fiber with a diameter of about 50 μm and has two end faces 13 and 14 running vertically with respect to the longitudinal axis. The optical core 11 of the fiber stub has a diameter of about 50 μm, while the external diameter of the optical cladding 12 is about 125 μm. The numerical aperture of the fiber stub is 0.24, for example, which corresponds to a half-value angle of about 14°.

The fiber stub 10 is coupled by its end face 14 to a corresponding end face of an optical fiber 20, which is a graded-index fiber with an optical core 21 and an optical cladding 22, the diameter of the optical core being about 62.5 μm; the numerical aperture is 0.275, which corresponds to a half angle of about 16°.

A light source 1 in the form of a laser diode radiates a light beam 2 into the end face 13 of the fiber stub, the optical axis B of the radiation source 1 and, thus, the main beam direction of the somewhat fanned-out light beam being inclined by an angle α relative to the geometrical axis A of the optical core of the fiber stub. Such a configuration has the result that the light beam 2' running in the fiber stub 10 also deviates in its direction from the geometrical axis of the optical core of the fiber stub by an angle φ, as a result of which, after a light distance of a few millimeters, the light beam experiences considerable expansion and is coupled into the optical fiber 20 in such a state.

Figure 2:
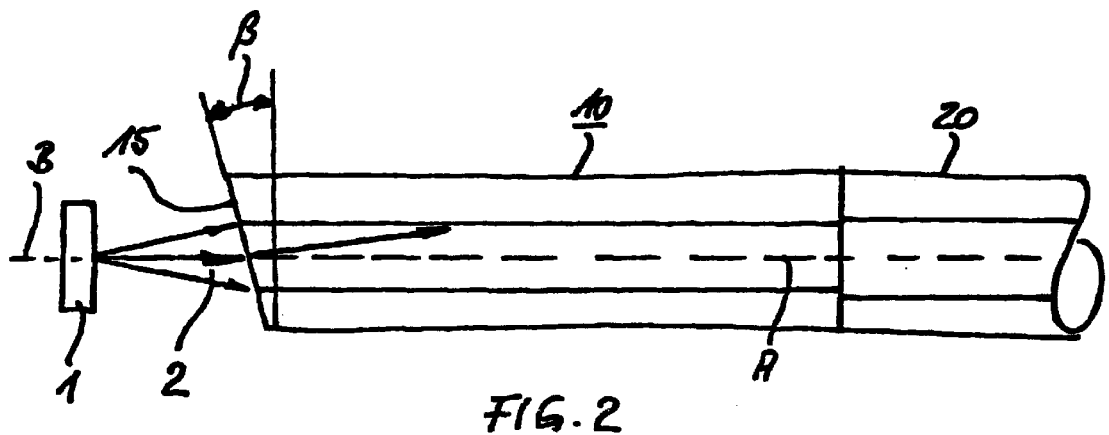
FIG. 2 is a diagrammatic, fragmentary illustration of the radiation coupling of FIG. 1 with a fiber stub having an inclined end face.

In accordance with FIG. 2, the fiber stub 10 is configured at the left-hand end such that the end face 15 is inclined by an angle β relative to the vertical. In such a case, the beam or light source 1 is disposed such that its optical axis B runs coaxially with respect to the geometrical axis A of the optical core of the fiber stub 10. As a result, when the light beam 2 enters the fiber stub, the light beam is refracted, which leads to the desired, inclined beam course.

Figure 3:
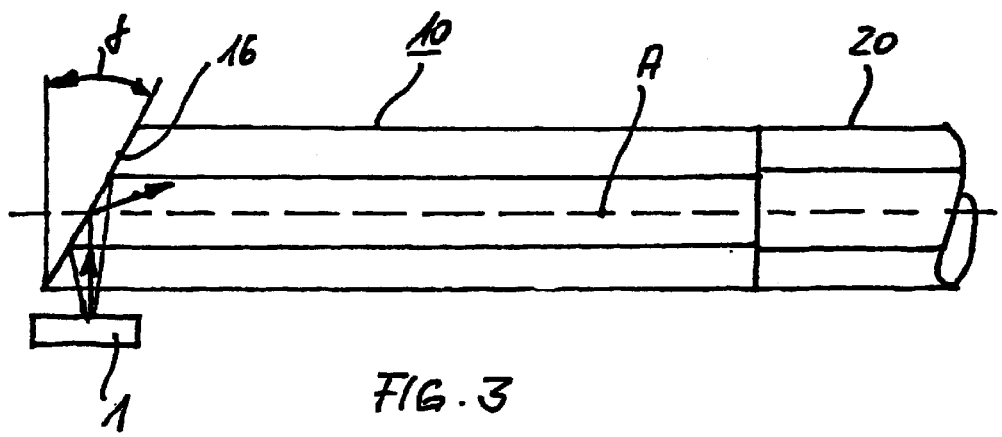
FIG. 3 is a diagrammatic, fragmentary illustration of a radial or lateral coupling of radiation with reflection at the inclined end face of the fiber stub according to the invention.

In accordance with FIG. 3, the fiber stub 10 is likewise provided with an inclined end face 16 at its left-hand end, but here the light beam is coupled-in from the side and the light beam arriving from the radiation source 1 is reflected at the end face 16. Such reflection can be accomplished, e.g., by providing the radiation emitted by the light source perpendicularly to the geometrical axis A of the optical core of the fiber stub and the inclined end face 16 having an angle γ not equal to 45°, for example, 48°.

In all cases, the slanted coupling-in is configured such that the light beam coupled into the fiber stub 10 forms an angle of about 7° with the geometrical axis of the optical core of the fiber stub. The configuration assumes that the radiation source 1 has a half-value angle of about 7.5°, which corresponds to a numerical aperture of about 0.15.

We claim:

1. An optical coupling system for coupling a radiation source emitting radiation as a light beam along an optical axis in an emission direction to a multimode optical waveguide having acceptance angle, the optical coupling system comprising:

an optical fiber having a stub, an optical core, an optical cladding, an end-side coupling-out face, an end-side coupling-in face, and a geometrical axis;

said stub being a multimode step-index waveguide having an acceptance angle greater than a half-value width of an angular distribution of the radiation emerging from the radiation source, said stub to be disposed downstream of the radiation source with respect to the emission direction;

said coupling-in face to be directed toward the radiation source;

said coupling-out face to be directed toward and directly connected to the optical waveguide; and said coupling-in face to be associated with the radiation source to couple the light beam into said optical fiber and to incline the light beam, as a coupled-in light beam, relative to said geometrical axis by an angle greater than 2° and less than the acceptance angle of the optical waveguide.

2. The coupling system according to claim 1, wherein the optical axis of the radiation source is inclined relative to said geometrical axis.

3. The coupling system according to claim 1, wherein:

the optical axis of the radiation source and said geometrical axis are coaxial; and said coupling-in face is inclined relative to said geometrical axis.

4. The coupling system according to claim 1, wherein:
said coupling-in face is inclined relative to said geometrical axis; and
the radiation source is to be disposed radially with respect to said stub to reflect the radiation at said coupling-in face.

5. The coupling system according to claim 1, wherein:
said optical core has a geometrical axis;
the optical axis of the radiation source and said geometrical axis of said optical core are coaxial; and
said coupling-in face is inclined relative to said geometrical axis of said optical core.

6. The coupling system according to claim 1, wherein:
said optical core has a geometrical axis;
said coupling-in face is inclined relative to said geometrical axis of said optical core; and
the radiation source is to be disposed radially with respect to said stub to reflect the radiation at said coupling-in face.

7. The coupling system according to claim 1, wherein:
the optical waveguide has an optical core with a given diameter; and
said optical core of said optical fiber has a diameter at most 1.1 times the given diameter.

8. An optical coupling system for coupling a radiation source emitting radiation as a light beam along an optical axis in an emission direction to a multimode optical waveguide having acceptance angle, the optical coupling system comprising:
an optical fiber having a coupling-out face, a coupling-in face, and a geometrical axis;
said fiber being a multimode step-index waveguide having an acceptance angle greater than a half-value width of an angular distribution of the radiation emerging from the radiation source, said fiber to be disposed downstream of the radiation source with respect to the emission direction;
said coupling-in face to be directed toward the radiation source;
said coupling-out face to be directed toward and directly connected to the optical waveguide; and
said coupling-in face to be associated with the radiation source to couple the light beam into said fiber and to incline the light beam, as a coupled-in light beam, relative to said geometrical axis by an angle greater than 2° and less than the acceptance angle of the optical waveguide.

9. The coupling system according to claim 8, wherein the optical axis of the radiation source is inclined relative to said geometrical axis.

10. The coupling system according to claim 8, wherein:
the optical axis of the radiation source and said geometrical axis are coaxial; and
said coupling-in face is inclined relative to said geometrical axis.

11. The coupling system according to claim 8, wherein:
said coupling-in face is inclined relative to said geometrical axis; and
the radiation source is to be disposed radially with respect to said fiber to reflect the radiation at said coupling-in face.

12. The coupling system according to claim 8, wherein:
said optical fiber has an optical core;
said optical core has a geometrical axis;
the optical axis of the radiation source and said geometrical axis of said optical core are coaxial; and
said coupling-in face is inclined relative to said geometrical axis of said optical core.

13. The coupling system according to claim 8, wherein:
said optical fiber has an optical core;
said optical core has a geometrical axis;
said coupling-in face is inclined relative to said geometrical axis of said optical core; and
the radiation source is to be disposed radially with respect to said fiber to reflect the radiation at said coupling-in face.

14. The coupling system according to claim 8, wherein:
the optical waveguide has an optical core with a given diameter; and
an optical core of said fiber has a diameter at most 1.1 times the given diameter.

15. An optical coupling system for coupling radiation to an optical waveguide, comprising:
a radiation source emitting radiation as a light beam along an optical axis in an emission direction;
a multimode optical waveguide having an acceptance angle;
an optical fiber having a stub, an optical core, an optical cladding, an end-side coupling-out face, an end-side coupling-in face, and a geometrical axis;
said stub being a multimode step-index waveguide having an acceptance angle greater than a half-value width of an angular distribution of the radiation emerging from said radiation source, said stub disposed downstream of said radiation source with respect to said emission direction;
said coupling-in face facing said radiation source;
said coupling-out face facing and directly connecting said multimode optical waveguide; and
said radiation source and said coupling-in face being associated with respect to one another to couple the light beam into said stub and incline the light beam, as a coupled-in light beam, relative to said geometrical axis by an angle greater than 2° and less than said acceptance angle of said multimode optical waveguide.

16. The coupling system according to claim 15, wherein said optical axis of said radiation source is inclined relative to said geometrical axis.

17. The coupling system according to claim 15, wherein:
said optical axis of said radiation source and said geometrical axis are coaxial; and
said coupling-in face is inclined relative to said geometrical axis.

18. The coupling system according to claim 15, wherein:
said coupling-in face is inclined relative to said geometrical axis; and
said radiation source is disposed radially with respect to said stub to reflect the radiation at said coupling-in face.

19. The coupling system according to claim 15, wherein:
said optical core has a geometrical axis;
said optical axis of said radiation source and said geometrical axis of said optical core are coaxial; and
said coupling in face is inclined relative to said geometrical axis of said optical core.

20. The coupling system according to claim 15, wherein:
said optical core has a geometrical axis;
said coupling-in face is inclined relative to said geometrical axis of said optical core; and said radiation source is disposed radially with respect to said stub to reflect the radiation at said coupling-in face.

21. The coupling system according to claim 15, wherein:

said multimode optical waveguide has an optical core with a given diameter; and said optical core of said optical fiber has a diameter at most 1.1 times said given diameter.

22. In an optical coupling system for coupling a radiation source emitting radiation as a light beam along an optical axis in an emission direction to a multimode optical waveguide having acceptance angle, an optical coupling system comprising:

an optical fiber having a stub, an optical core, an optical cladding, an end-side coupling-out face, an end-side coupling-in face, and a geometrical axis;

said stub being a multimode step-index waveguide having an acceptance angle greater than a half-value width of an angular distribution of the radiation emerging from the radiation source, said stub to be disposed downstream of the radiation source with respect to the emission direction;

said coupling-in face to be directed toward the radiation source;

said coupling-out face to be directed toward and directly connected to the optical waveguide; and said coupling-in face to be associated with the radiation source to couple the light beam into said optical fiber and to incline the light beam, as a coupled-in light beam, relative to said geometrical axis by an angle greater than 2° and less than the acceptance angle of the optical waveguide.

23. The coupling system according to claim 22, wherein the optical axis of the radiation source is inclined relative to said geometrical axis.

24. The coupling system according to claim 22, wherein:

the optical axis of the radiation source and said geometrical axis are coaxial; and said coupling-in face is inclined relative to said geometrical axis.

25. The coupling system according to claim 22, wherein:

said coupling-in face is inclined relative to said geometrical axis; and the radiation source is to be disposed radially with respect to said stub to reflect the radiation at said coupling-in face.

26. The coupling system according to claim 22, wherein:

said optical core has a geometrical axis;

the optical axis of the radiation source and said geometrical axis of said optical core are coaxial; and said coupling-in face is inclined relative to said geometrical axis of said optical core.

27. The coupling system according to claim 22, wherein:

said optical core has a geometrical axis;

said coupling-in face is inclined relative to said geometrical axis of said optical core; and the radiation source is to be disposed radially with respect to said stub to reflect the radiation at said coupling-in face.

28. The coupling system according to claim 22, wherein:

the optical waveguide has an optical core with a given diameter; and said optical core of said optical fiber has a diameter at most 1.1 times the given diameter.

* * * * *